Oct. 27, 1970 C. W. WATSON, JR., ET AL 3,536,935

RETRIGGERABLE DELAY FLOP

Filed July 16, 1968 2 Sheets-Sheet 1

Oct. 27, 1970 C. W. WATSON, JR., ET AL 3,536,935

RETRIGGERABLE DELAY FLOP

Filed July 16, 1968 2 Sheets-Sheet 2

United States Patent Office 3,536,935
Patented Oct. 27, 1970

3,536,935
RETRIGGERABLE DELAY FLOP

Charles W. Watson, Jr., Norristown, and John N. Stanley, Center Square, Pa., assignors to Leeds & Northrup Company, Philadelphia, Pa., a corporation of Pennsylvania Filed July 16, 1968, Ser. No. 745,215
Int. Cl. H03k 3/26
U.S. Cl. 307—273 3 Claims

ABSTRACT OF THE DISCLOSURE

A retriggerable delay flop without recovery time is described. The circuit is capable of excitation from the quiescent state to the active state by the termination of a direct voltage level at the input circuit and by a pulse at the input circuit whose duration is less than one millionth of the duration of the active state at the output of the delay flop. The circuitry includes first and second monostable multivibrators and an OR circuit connecting input pulses and the output of the first monostable multivibrator to the input of the second monostable multivibrator. The input to the second monostable multivibrator is connected directly to the timing capacitor so that the circuit can be retriggered. A clamping circuit and a Zener diode are provided in the second monostable multivibrator to prevent false turn-on and turn-off of one of the transistors.

BACKGROUND OF THE INVENTION

Many system applications require an electronic timer. Monostable multivibrators, commonly referred to as single shots, have been extensively used as timers.

One problem with such circuits is that they usually have a finite recovery time. The monostable multivibrator is switched to its active state and after it returns to its quiescent state, it cannot be retriggered for a finite time, referred to as recovery time. Examples of attempts to overcome the recovery time problem are described in Electronic Equipment Engineering, June 1963, pages 37 and 38, Circuit Design No. 32, by J. K. Dickson, "Monostable Circuit With Negative Recovery Time," and in Electronic Equipment Engineering, June 1959, pages 54 and 55, "Transistorized Equipment Design."

A difficult problem which is presented by circuits of the type described in these articles, and by most monostable multivibrator circuits, is that where the time duration of the active state is relatively long, the time duration of the input pulse must also be relatively long. It is desirable in many cases to have a timing circuit having a very long active state but which will nevertheless be triggered by input pulses of quite short duration.

Another requirement on many timing circuits is that they be retriggerable. That is, upon reception of a pulse, the circuit is switched to its active state and timing begins. If another pulse is received before the termination of the active state, the timing circuit must respond to this second input pulse to restart the timing cycle. This is referred to as a retriggerable timing circuit.

In addition to the above requirements, in many applications the timing circuit must also be responsive to the termination of a direct voltage level at the input circuit. In the prior art, multivibrators have commonly been made responsive to a change in a direct voltage level by differentiating the direct voltage level to effectively transform it into a pulse. The problem with this approach is that while the monostable multivibrator is switched to its active state upon termination of the direct voltage level, it immediately begins its timing period. That is, the multivibrator is timed out a given time period after the termination of the direct voltage level. In many applications it is desirable that the multivibrator change its output, for example, switch to the "1" condition, upon a change in the input to a direct voltage level, but that it start its timing period only upon termination of this direct voltage level.

SUMMARY OF THE INVENTION

This invention relates to timing circuits and more particularly to a retriggerable delay flop without recovery time and which is capable of excitation from the quiescent state to the active state by the application of a direct voltage level at the input and also by a pulse at the input whose duration is less than one millionth of the duration of the active state of the delay flop, but that it start its timing period only upon termination of this direct voltage level.

It is an important object of the present invention to provide a timing circuit which responds to relatively narrow input pulses but which is capable of providing time periods which are in the order of more than a million times the duration of the input pulse.

It is another object of the present invention to provide a timing circuit which is switched to its active state by input pulses and which is also switched to its active state by the application of a direct voltage at the input circuit and which does not begin timing out until termination of this direct voltage level.

It is another object of the present invention to provide a retriggerable timing circuit.

It is another object of the present invention to provide a timer with a monostable multivibrator having good isolation between the input and the output.

It is another object of the present invention to provide an erroneous message detector which will produce an output when a message on the input circuit is not within prescribed limits.

The foregoing and other objects, features and advantages of the invention will be better understood from the following more detailed description and appended claims together with the drawings.

FIGS. *2a–2d* are waveforms depicting the operation of the invention, and

FIGS. *3a–3b*, *4a–4b*, *5a–5b* and *6a–6b* depict the operation of the circuit as an erorneous message detector.

DESCRIPTION OF A PARTICULAR EMBODIMENT

Figure 1:
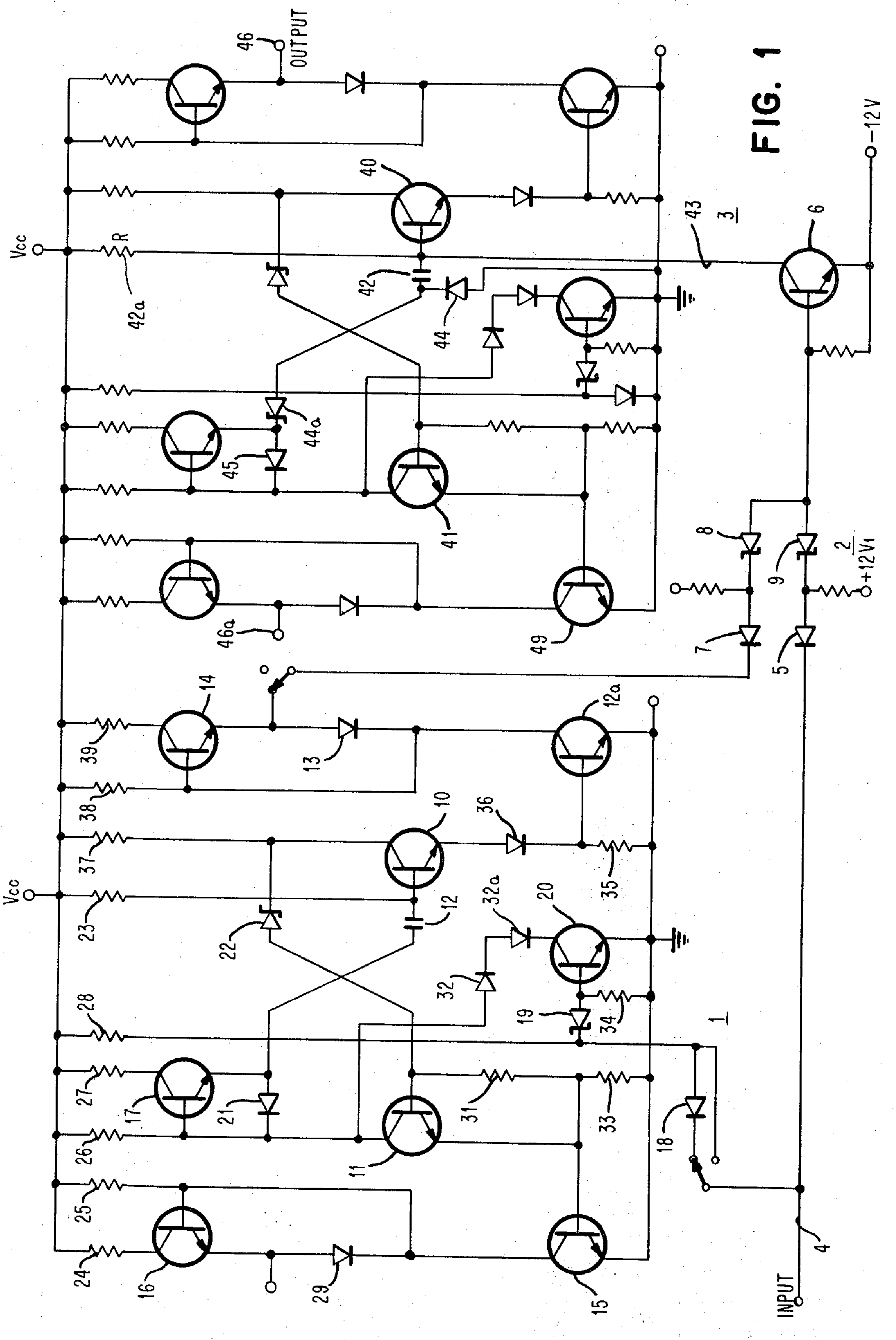
FIG. 1 shows the circuitry of the present invention.

Referring now to FIG. 1, there is shown the retriggerable delay flop which includes a first monostable multivibrtaor 1, an OR circuit 2 and a second monostable multivibrator 3.

The input to the delay flop is applied over input line 4. The input is applied to the input of the first monostable multivibrator 1 and it is applied to one input diode 5 of the OR circuit 2. The output of OR circuit 2 is connected through the inverter-driver transsistor 6 to the input to the second multivibrator 3.

The OR circuit 2 includes a second input diode 7. The OR circuit 2 also includes Zener diodes 8 and 9 having their anodes connected together and to the output of the OR circuit. The Zener diodes are provided in accordance with standard practice to insure that no base current flows through the inverter-driver transistor 6 when both inputs to the OR circuit are at ground potential, and to provide a noise margin above ground potential for isolation purposes.

The monostable multivibrator 1 includes the normally conducting transistor 10 and the normally cut off transistor 11. The monostable multivibrator 1 includes a coupling, or timing, capacitor 12 connected between the base of transistor 10 and the collector of transistor 11.

A transistor 12*a* serves as an output driver. The collector 12*a* is connected through diode 13 to the output terminal of the multivibrator. The transistor 14 provides a complete, active pull-up circuit on the output. That is, when the transistor 12*a* is turned on the output terminal is connected to ground through diode 13. Current through diode 13 holds transistor 14 in the non-conductive state. When the transistor 12*a* is cut off the transistor 14 provides a conducting path to the positive voltage, which pulls up the output terminal to a positive level.

Similar transistors 15 and 16 are shown connected in circuit for providing an output on the second output terminal, although this second output terminal is not used. A transistor 17 provides charging current to the timing capacitor 12.

In one particular embodiment of the invention the transistor 11 is switched to its astable condition by a positive input pulse applied to the input of the monostable multivibrator 1. The monostable mutlivibrator 1 remains in the astable condition, that is, transistor 11 conducting and transistor 10 cut off until the time duration $T_D$ has been satisfied (to be hereinafter described).

The component values of the multivibrator 1 can be selected in accordance with standard design techniques. Alternatively (except for capacitor 12), the multivibrator 1 may be an integrated circuit or one half of a dual integrated circuit—one suitable type being available from Amelco Semiconductor Division of Teledyne, Inc., Mountain View, Calif. the Type 342 Dual One Shot.

Normally, the input to the monostable multivibrator 1 is at ground potential. The ground potential acts through diode 18 and Zener diode 19 to hold the base of transistor 20 at or near ground potential to hold transistor 20 off. Upon occurrence of a positive input pulse the diode 18 is rendered nonconducting. The voltage on the base of transistor 20 rises and transistor 20 is turned on, pulling the collector of transistor 20 toward ground potential. This turns the transistor 10 off and by means of the cross coupling and Zener diode 22 the transistor 11 is turned on. That is, the ground potential is coupled through diode 21 to drive the left hand side of timing capacitor 12 toward ground potential. This is coupled through timing capacitor 12 to the base of transistor 10 thereby cutting that transistor off. The collector of transistor 10 is cross coupled through Zener diode 22 back to the base of transistor 11 to turn that transistor on. The effect is regenerative and the monostable multivibrator is switched to its astable state. It will remain in the astable state for a time period depending upon the time constant determined primarily by the capacitance of timing capacitor 12 and the resistance of the resistor 23.

The monostable multivibrator 3 is similar to the monostabl emultivibrator 1 and like competent values are used. Alternatively (except for capacitor 42, diode 44 and Zener diode 44*a*), the multivibrator 3 may be an integrated circuit—the other half Type 342 Dual One Shot. The monostable multivibrator 3 similarly includes a normally conducting transistor 40, a normally cut off transistor 41 and a timing capacitor 42. The monostable multivibrator 3 differs from the multivibrator 1 in that the input line 43 is connected directly to the junction of the timing capacitor 42 and the base of transistor 40.

The direct connection between the collector of inverter driver transistor 6 and the timing capacitor 42 allows retriggering of the circuit. The pulse is applied through OR circuit 2 to the base of transistor 6 rendering it conductive and applying approximately −11.8 volts to the right hand plate of capacitor 42 thereby starting the charging of that capacitor. Transistor 40 is now cut off and transistor 41 is on. Diode 44 clamps the left hand plate of capacitor 42 to approximtaely −10.7 volt. Diode 44 in conjunction with Zener diode 44*a* which is now nonconducting, effectively isolates the collector of conductive transistor 41 from being pulled negative and being cut off erroneously by pulses on input line 43. Upon termination of the pulse through OR circuit 2, transistor 6 is again cut off and the timing-out process begins. The discharge path of capacitor 42 (during time-out) is through Zener diode 44*a*, diode 45, conductive transistor 41 and the base-emitter junction of conducting transistor 49 and its base-emitter resistor. However, at any time the transistor 6 may be turned on again thereby restarting the charging process described above and at the termination of which a new timing-out process begins.

This is contrasted to other types of monostable multivibrators, such as the monostable multivibrator 1, in which there is a finite delay, referred to as the recovery time, before the multivibrator 1 can be retriggered. After monostable multivibrator 1 is triggered to its astable state, it must return to the stable state and remain there for approximately 10% of the time period of the astable state before it can be retriggered to the astable state. If it is retriggered before this time, the time period of the astable state will be shorter than desired.

Figure 2:
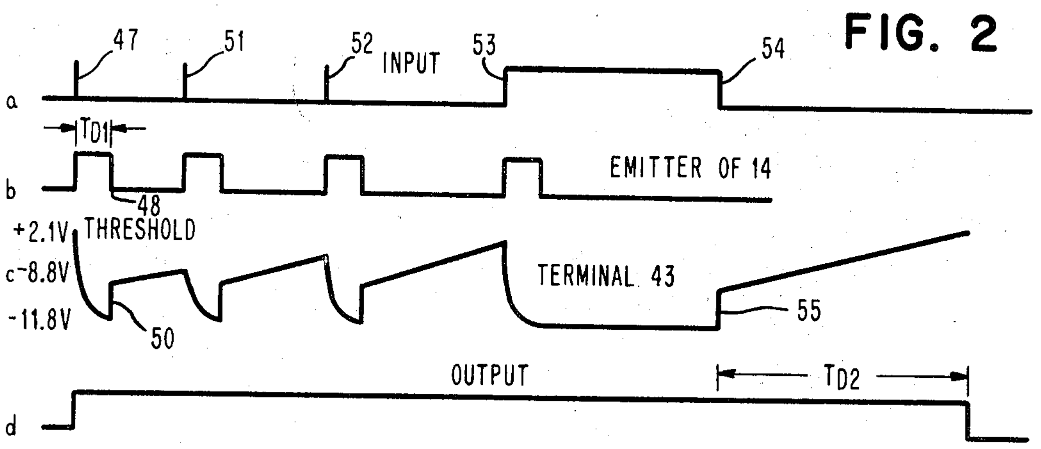

The operation of the circuit can be better understood with reference to FIGS. 2*a*–2*d* which respectively show pulses on the input circuit; the voltage at the output terminal of multivibrator 1, that is, the emitter of the transistor 14; the voltage on the input line 43 of the multivibrator 3; and the voltage on the output line 46 of multivibrator 3. Upon the occurrence of the input pulse 47, FIG. 2*a*, the multivibrator 1 is switched to its astable state and remains in its astable state for a time period denoted TD1 (see FIG. 1*b*). The positive going waveform at the emitter of transistor 14 is applied through OR circuit 2 to the base of the driver transistor 6 to turn that transistor on. The input line 43 of multivibrator 3 is driven to −11.8 volts. (The −12 volts applied to the emitter of transistor 6 less the drop across the transistor.) Transistor 40 is turned off and multivibrator 3 goes to its astable state. Therefore, a positive going voltage appears at the output terminal 46 as shown in FIG. 2*d*.

In FIG. 1*c*, note that when the transistor 6 is turned off, (this occurs when the emitter of transistor 14 goes to ground at the point 48 in FIG. 2*b*) then the terminal 43 rises to −8.8 volts. The −8.8 volt level is determined by the path to ground potential through transistors 49 and 41, diode 45 and Zener 44*a* at the start of the timing cycle minus the initial full charge on capacitor 42 (+2.3 v.−11.1 v.=−8.8 v.). At the point 50, FIG. 1*c*, the multivibrator 3 begins to time out. It should be noted that in FIG. 1*c* the exponential curve of the drop from +2.1 volts to −11.8 volts has been exaggerated. Actually, the drop will be much sharper. Also, TD1 will be much shorter.

From the point 50 the voltage at the input terminal 43 (the base of transistor 40) begins to rise as capacitor 42 discharges. That is, the monostable multivibrator 3 begins to time out. Before it is timed out, the second input pulse 51, FIG. 1*a*, occurs. Again, the input terminal 43 is brought down to −11.8 volts and the monostable multivibrator starts to time out again.

The input pulse 52 occurs before the monostable multivibrator is timed out and the timing out cycle begins again. Before it is timed out the voltage level on the input line 4 changes to a positive level as indicated at 53 in FIG. 2*a*. This positive level is applied through OR circuit 2 to hold the transistor 6 on. The input line 43, FIG. 1*c*, is held at −11.8 volts until the positive input level terminates at 54, FIG. 1*a*. Then as indicated at 55 in FIG. 1*c*, the monostable multivibrator starts to time out. The time constant for this timing out is determined by the capacitor 42 and the resistor 42*a*. When the voltage at the base of the transistor 40 reaches +2.1 volts, which is the threshold for switching the multivibrator 3, switching occurs and the output, FIG. 1*d*, drops. Note that the output drops a time delay TD2 after the termination of the input voltage level at 54, FIG. 1*a*.

As mentioned before, the waveforms in FIGS. 1*a*–1*b* are exaggerated for purposes of description. Actually, TD2 will be very much longer than TD1. In one embodiment, TD2 is approximately 15 seconds and TD1 is 0.7 second. The input pulses, 47, 51, 52 are of even shorter duration. They may be in the order of one or two microsecond pulses.

Figure 3:
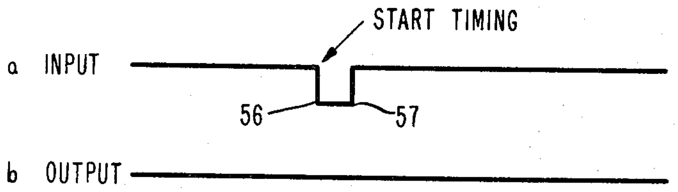

An example of the operation of the circuit of this invention in a particular application is shown in FIGS. 3*a*, 3*b*, 4*a*, 4*b*, 6*a* and 6*b*. These waveforms depict the operation of the invention as an erroneous message detector. FIG. 3*a* shows a legitimate message on the input circuit. In FIG. 3*a*, the input is initially in the up condition. The transistor 6 is conducting. The circuit is in the active state. The input line goes negative at 56 and positive at 57. This is one legitimate message. The multivibrator 3 starts timing out at 56. However, it never times out completely because the termination of the legitimate message at 57 occurs before the multivibrator is timed out. Therefore, the output, FIG. 3*b*, does not change.

Figure 4:
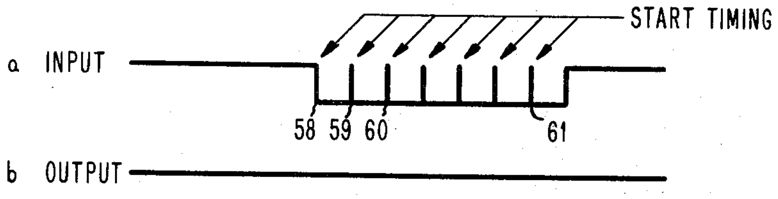

FIG. 4*a* depicts another condition, namely, a series of legitimate messages separated by narrow pulses. Again, the multivibrator 3 starts to time out at each of the times 58, 59, 60 . . . 61. It never times out. Therefore, the output, FIG. 4*b*, never changes state.

Figure 5:
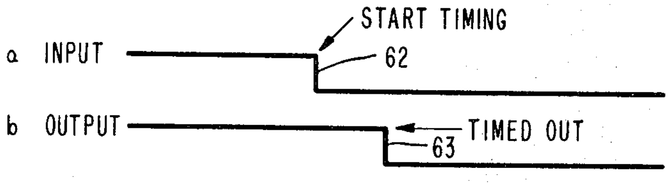

FIG. 5*a* shows an isolated erroneous message. The input switches to a more negative level at 62 but it never returns to a positive level. The multivibrator 3 starts timing at the time 62 and the output terminal switches at the time 63, to indicate an erroneous message, FIG. 5*b*.

Figure 6:
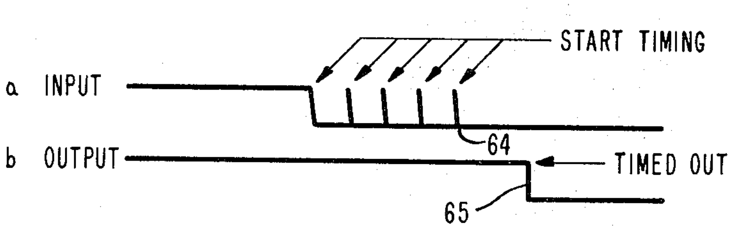

FIG. 6*a* shows another erroneous message condition. In this case the erroneous message is in a series. Again the multivibrator 3 starts timing out at the point 64. The output terminal 46 switches at the time 65, FIG. 6*b*, to indicate an erroneous message.

Referring back to FIG. 1, there can now be described another feature of the circuit of this invention which makes it particularly suitable for use as an erroneous message detector. The Zener diode **44*a* has its anode connected through diode 44 to the common terminal, that is, ground potential. The cathode of Zener diode 44*a* is connected through the diode 45 to the collector of transistor 41. The Zener diode 44*a* isolates the collector of transistor 41 from the input terminal thereby preventing false turn-off of the transistor 41. While the circuit has thus far been described only as having an output at the terminal 46, it also has a usable output at the terminal 46*a*. If the Zener diode 44*a* were not provided for isolation purposes, the output at 46*a* would tend to change in response to the pulses 59, 60 and 61** in FIG. 4*a*. This, of course, would be undesirable since the output should change only when there is an erroneous message.

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:

1. A retriggerable delay flop having zero recovery time and capable of excitation from the quiescent state to the active state by the termination of a direct voltage level at the input circuit and by a pulse at said input circuit whose duration is less than one millionth of the duration of the active state at the output of said delay flop, comprising:

a first monostable multivibrator having an input terminal and an output terminal, an OR circuit having two input terminals and an output terminal, said input circuit being connected to said input terminal of said first monostable multivibrator and to one of the input terminals of said OR circuit, said output terminal of said first monostable multivibrator being connected to the other input terminal of said OR circuit, a second monostable multivibrator, said second monostable multivibrator including:

a timing capacitor connected to control the time duration of the active state of said second multivibrator, and means for applying the signal on the output terminal of said OR circuit directly to said timing capacitor.

2. The delay flop recited in claim 1 wherein said second monostable multivibrator includes:

a first transistor normally biased to the on condition and a second transistor normally biased to the off condition, and a clamp circuit connected to the collector of said second transistor and referenced to a common potential to prevent false turn-off of said second transistor.

3. The delay flop recited in claim 1 wherein said second monostable multivibrator includes:

a first transistor normally biased to the on condition and a second transistor normally biased to the off condition, and a Zener diode connected between said timing capacitor and the collector of said second electrode to prevent false turn-on of said second transistor.

References Cited

UNITED STATES PATENTS

| | | | |
|---|---|---|---|
| 3,271,566 | 9/1966 | Martens | 307—218 X |
| 3,413,490 | 11/1968 | Breunig et al. | 307—233 |

DONALD FORRER, Primary Examiner

R. C. WOODBRIDGE, Assistant Examiner

U.S. Cl. X.R.

307—218, 293; 328—120, 207; 331—113

PO-1050
(5/69)

UNITED STATES PATENT OFFICE
CERTIFICATE OF CORRECTION

Patent No. 3,536,935 Dated November 19, 1970

Inventor(s) CHARLES W. WATSON, JR. and JOHN N. STANLEY

It is certified that error appears in the above-identified patent and that said Letters Patent are hereby corrected as shown below:

Column 2, line 53, "brtaor" should read --brator--;
line 59, "transsistor" should read --transistor--

Column 3, line 55, "stabl emultivibrator" should read --stable multivibrator--;
line 55, "competent" should read --component--;
line 73, "-10.7 volt" should read -- -0.7 volts--

Column 4, lines 46 & 47, all small "v." should read --V--.

SIGNED AND SEALED
JAN 1 9 1971

(SEAL)
Attest:

Edward M. Fletcher, Jr.
Attesting Officer

WILLIAM E. SCHUYLER, JR.
Commissioner of Patents